Patented Nov. 27, 1928.

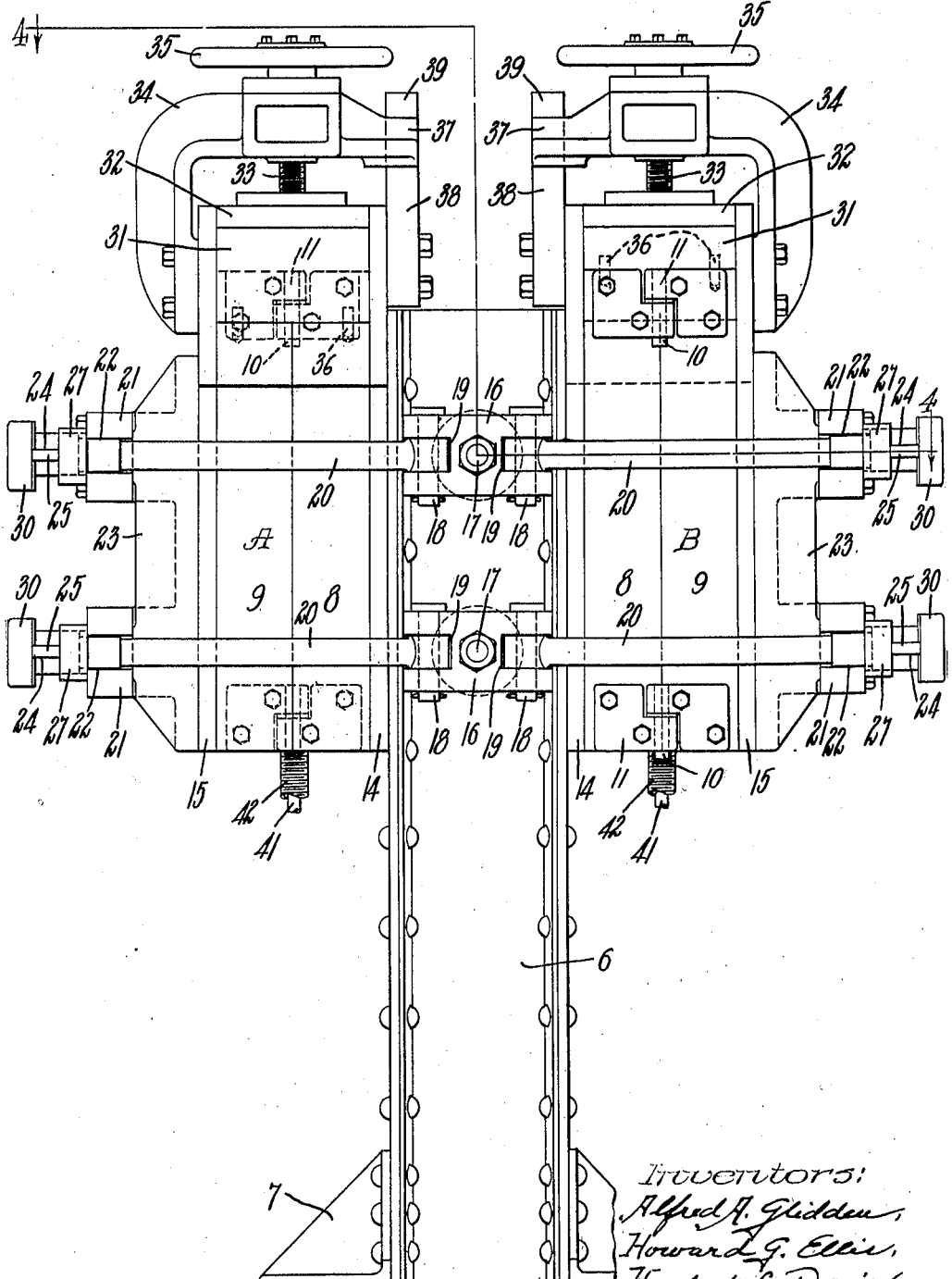

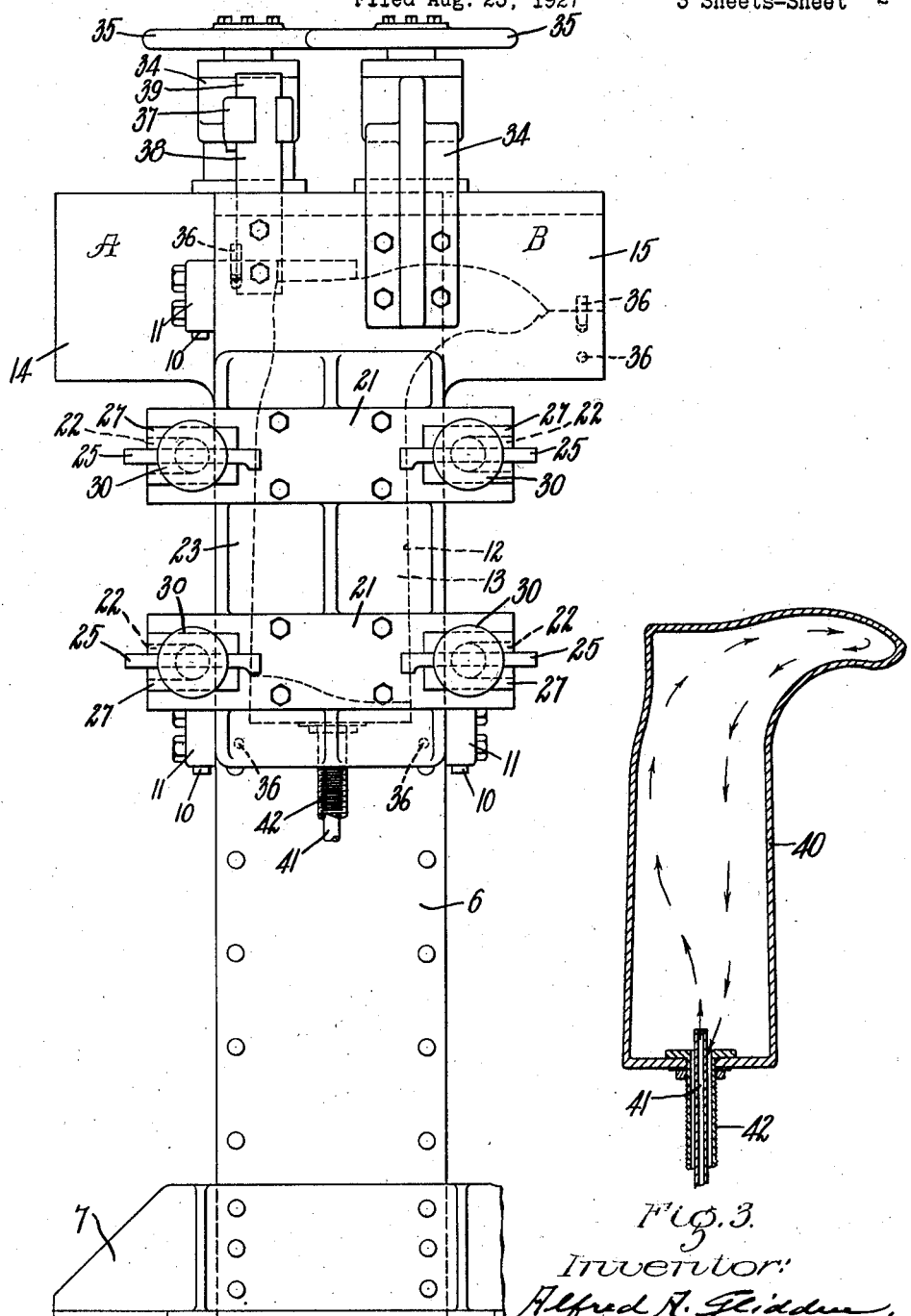

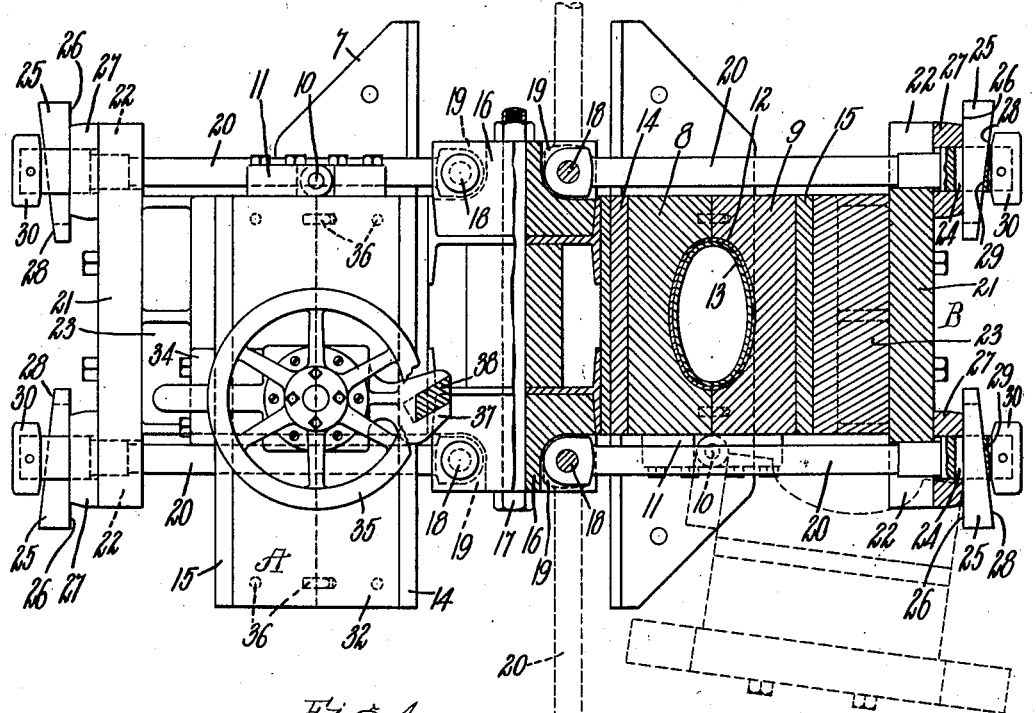
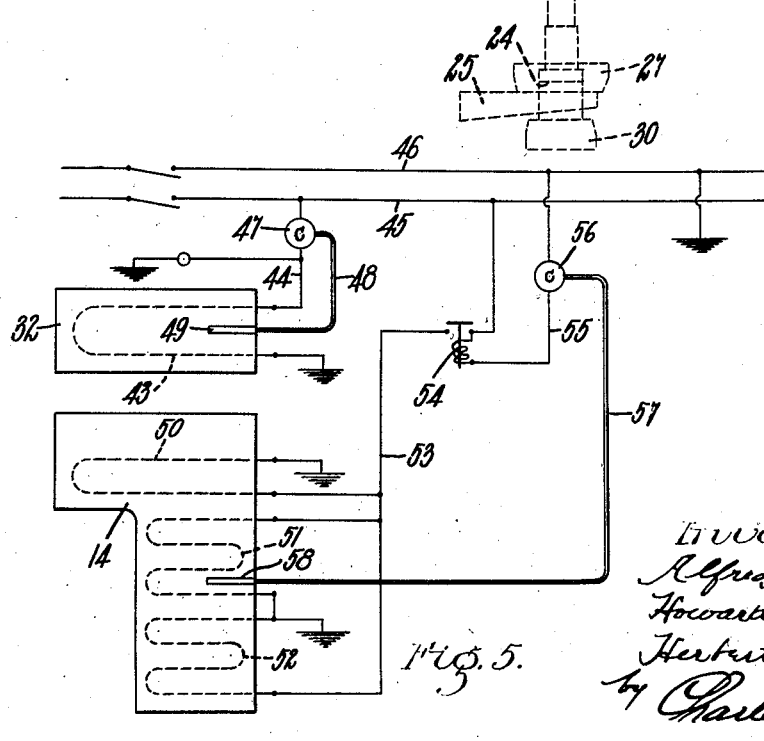

1,692,828

UNITED STATES PATENT OFFICE.

ALFRED A. GLIDDEN, OF WATERTOWN, HOWARD G. ELLIS, OF WALTHAM, AND HERBERT L. DAVIS, OF WALPOLE, MASSACHUSETTS, ASSIGNORS TO HOOD RUBBER COMPANY, OF WATERTOWN, MASSACHUSETTS, A CORPORATION OF MASSACHUSETTS.

MOLD FOR RUBBER BOOTS.

Application filed August 23, 1927. Serial No. 214,941.

This invention relates to a mold for rubber boots and has for its object to provide a device in which a rubber boot may be molded and cured in its entirety in a single operation.

Another object of the invention is to provide as one of the forming members of a mold an expandible tree, the latter co-operating with a plurality of exterior forming plates to shape the boot and also to form the interior thereof.

The invention also contemplates supplying heat on the interior of said tree, which will be communicated through the tree to the inside of the boot and assist in the molding and curing operation.

Another object of the invention is to provide a means for heating the various forming plates, together with a means for controlling the heating means and maintaining the same at the desired temperature, whereby heat of a predetermined temperature may be supplied to the boot from the outside in the curing operation.

By providing the mold of this invention with a heated interior forming member in addition to the means for heating the exterior forming plates, the process of molding and curing the rubber boot is greatly accelerated and improved, as the heat from the interior of the expandible boot tree is radiated outwardly into the material of the boot, while the heat from the exterior heating units radiates inwardly into said material thereby reducing the period required to cure the boot and at the same time performing the process with a greater degree of efficiency.

The invention consists in a mold for rubber boots and the like as set forth in the following specification and particularly as pointed out in the claims thereof.

Referring to the drawings:—

Figure 1 represents a front elevation of a mold for rubber boots embodying our invention.

Fig. 2 is a side elevation of the mold as viewed from the right of Fig. 1.

Fig. 3 is a longitudinal sectional view of an expandible tree which constitutes one of the forming members of the mold.

Fig. 4 is a partial plan view and partial horizontal section as taken on the line 4—4 of Fig. 1.

Fig. 5 is a diagrammatic representation of the electric wiring for the heating means and means for controlling the temperature of the same.

Like numerals refer to like parts throughout the several views of the drawings.

In the drawings, 6 is a standard which may be constructed in any suitable manner and 7 represents a base for said standard. Mounted upon the opposite sides of the standard 6 are two complete mold units A and B, each of said units being identical in structure, but preferably being right and left hand and a description, therefore, of the mold A will apply equally well to the mold B. Each mold unit embodies therein a side forming plate 8 which is rigidly secured to the standard 6, and a side forming plate 9 which is pivoted at 10 to the plate 8 by means of suitable hinges 11. The side forming plates 8 and 9 are each recessed in a similar manner to provide a cavity 12 in which a boot 13 may be molded, see Fig. 4. Interposed between a side of the forming plate 8 and standard 6 is a heating unit 14 for the plate 8, and fastened to the side of the forming plate 9 is a heating unit 15 for said plate 9. These units will be hereinafter more completely described.

The mechanism for clamping the forming plates 8 and 9 securely together is as follows:—Secured to the front and rear sides of the standard 6 are a plurality of blocks 16. These blocks are secured in pairs to the standard 6 by bolts 17. Each block 16 is provided with a pair of recesses 19 and in each of these recesses a clamping arm 20 is secured by a pivot member 18. Each clamping arm 20 is adapted to interlock with a bar 21, the latter being provided with a slot 22 at each end thereof, into which the arms 20 project when the mold is closed.

The bar 21 is rigidly secured to a reinforcing member 23 in turn rigidly secured to the plate constituting the heating unit 15. Each clamping arm 20 is slotted at 24 adjacent to the outer end thereof to receive a wedge 25, an edge 26 of which engages the outer face of a collar 27 which is loosely mounted upon the arm 20. An edge 28 of the wedge 25 is disposed at an acute angle to the edge 26 of said wedge and is adapted to engage an edge 29 of the slot 24 and co-operate therewith in forcing the forming plate 9 toward the forming plate 8 when the wedge 25 is driven inwardly within the slot 24. A cap 30 is mounted at the outer extremity of the clamping arm 20 and may be utilized as a handle when swinging said arm outwardly or inwardly.

Mounted upon the swinging side forming plate 9 is a forming plate 31 for the outer sole of the boot. A heating unit 32 for the outer sole forming plate 31 is fastened rigidly to said plate and said plate and heating unit are supported upon a screw 33 which is mounted in a bracket 34, in turn rigidly secured to the plate of the heating unit 15. A hand wheel 35 is provided for the screw 33 being so associated therewith that by rotating the hand wheel the forming plate 31 and heating unit 32 may be raised and lowered in unison.

The various forming plates are all correctly positioned relatively to each other when the mold is closed, by means of dowel pins 36, said dowel pins being rigidly secured in one of the forming members and projecting into an oppositely disposed recess in an adjacent forming member.

Formed integral with the bracket 34 is a bifurcated arm 37 and when the side forming plate 9 is closed against the forming plate 8 and the sole forming plate 31 is in position above the side forming plates 8 and 9, the arm 37 engages the post 38 beneath a head portion 39 of said post, and said arm and post will co-operate with each other to brace the bracket 34 and prevent the same from yielding upwardly when pressure is applied within the mold.

Co-operating with the forming plates 8, 9 and 31 in forming the boot 13 is an expandible boot tree 40, see Fig. 3, which is adapted to be inserted within the cavity 12 between the forming plates and co-operate with the latter in forming the boot. The boot tree 40 has a hollow body member constructed of expandible material and is provided with an inlet pipe 41 for a heated pressure fluid which may circulate within said body member and be discharged therefrom through an outlet pipe 42.

The pressure fluid employed may be either heated water or air and when said fluid is admitted to the interior of the tree and the latter is in position within the cavity 12 of the mold, the tree will co-operate with the forming plates in molding and shaping the boot, and, when the water is heated, in curing the boot. In other respects the boot tree 40 and its manner of operation will not be described as it is the subject-matter of another application for United States Letters Patent on "boot tree" filed by Alfred A. Glidden, Thomas M. Knowland and Herbert L. Davis on August 22, 1927, Serial No. 214,622.

The plates of the heating units 14, 15 and 32 are heated and the temperature of said plates controlled as follows:—Located within the plate of the heating unit 32, which is preferably constructed of cast aluminum, is a coil of suitable resistance wire 43, and one end of said coil is connected by a wire 44 to a main electric feed wire 45, while the other end of said coil is grounded. An electrical control unit 47 of well-known construction is interposed between the heating unit 32 and the feed wire, and said control unit is connected by a small flexible tube 48 with a control bulb 49 of well-known construction, which is located within the heating unit. The control unit and bulb act automatically to maintain the temperature of the heating unit 32 approximately 315° Fahrenheit in a well-known manner.

The heating units 14 and 15, which are identical in construction, each have resistance coils 50, 51 and 52 located therein, one end of each of said coils being connected to a wire 53, which in turn leads to the main feed wire 45, a relay 54 being interposed in the circuit to said feed wire. The other ends of the coils 50, 51 and 52 are grounded. The relay 54 is connected by a wire 55 to the wire 46 of the main electric supply, an electrical control unit 56 being interposed in the circuit between said relay and said feed wire. The control unit 56 is connected by a small flexible tube 57 to a control bulb 58 positioned within the heating unit, and the control unit and bulb act to automatically maintain the heat of the heating units 14 and 15 at approximately 280° Fahrenheit in a well-known manner.

The general operation of the mechanism hereinbefore specifically described is as follows:—After the various parts of the boot 13 have been assembled upon the expandible tree 40, the latter with the boot parts thereon is inserted within the cavity 12 of the mold between the side forming plates 8 and 9, and the plate 9 is securely clamped against the plate 8 by swinging the clamping arms 20 into the slots 22 of the bar 21 and then forcing the wedges 25 inwardly into the slots 24 provided in the arms 20. The sole forming plate 31 and its heating unit 32 are then lowered into position above the plates 8 and 9 by rotating the hand wheel 35. The boot tree 40 is then expanded by admitting a suitable heated pressure fluid thereinto, whereupon the material of the boot is forced tightly against the walls of the cavity 12 within the forming plates. At the same time the electric current is applied to the heating units 14, 15 and 32 and the temperature of the latter is maintained at a uniform temperature by the controlling units 47 and 56 until the material of which the boot is constructed has been molded and cured. The boot tree 40 is then deflated and removed from the mold.

We claim:

1. A mold for rubber boots and the like having, in combination, a standard, a forming plate for a side of the leg and foot portions of a boot rigidly fast to said standard, another forming plate for the other side of the leg and foot portions of said boot pivotally mounted upon said first-mentioned forming plate, an outer sole forming plate, and an expandible tree between the forming plates and co-operating therewith to form a boot.

2. A mold for rubber boots and the like having, in combination, a standard, a forming plate for a side of the leg and foot portions of a boot rigidly fast to said standard, another forming plate for the other side of the leg and foot portions of said boot pivotally mounted upon said first-mentioned forming plate, an outer sole forming plate mounted upon one of said side plates, means to raise and lower said sole forming plate, and an expandible tree between the side forming plates and co-operating therewith to form a boot.

3. A mold for rubber boots and the like having, in combination, a standard, a forming plate for a side of the leg and foot portions of a boot rigidly fast to said standard, another forming plate for the other side of the leg and foot portions of said boot pivotally mounted upon said first-mentioned forming plate, means to clamp said side plates together, an outer sole forming plate mounted upon one of said side plates, means to raise and lower said sole forming plate, and an expandible tree between the forming plates and co-operating therewith to form a boot.

4. A mold for rubber boots and the like having, in combination, a standard, a forming plate for a side of the leg and foot portions of a boot rigidly fast to said standard, another forming plate for the other side of the leg and foot portions of said boot pivotally mounted upon said first-mentioned forming plate, means to clamp said side plates together, an outer sole forming plate mounted upon one of said side plates, means to heat the forming plates, and an expandible tree between the forming plates and co-operating therewith to form a boot.

5. A mold for rubber boots and the like having, in combination, a standard, a forming plate for a side of the leg and foot portions of a boot rigidly fast to said standard, another forming plate for the other side of the leg and foot portions of said boot pivotally mounted upon said first-mentioned forming plate, means to clamp the side plates together, an outer sole forming plate mounted upon one of the side plates, means to heat the forming plates, an expandible tree between the forming plates and co-operating therewith to form a boot, and fluid means to simultaneously expand and heat said tree.

6. A mold for rubber boots and the like having, in combination, a standard, a forming plate for a side of the leg and foot portions of a boot rigidly fast to said standard, another forming plate for the other side of the leg and foot portions of said boot pivotally mounted upon said first-mentioned forming plate, means to clamp the side plates together, an outer sole forming plate mounted upon one of the side plates, means to heat the forming plates, means to control the temperature of said heating means, an expandible tree between the forming plates and co-operating therewith to form a boot, and fluid means to simultaneously expand and heat said tree.

7. A mold for rubber boots and the like having, in combination, a standard, a forming plate for a side of the leg and foot portions of a boot rigidly fast to said standard, another forming plate for the other side of the leg and foot portions of the boot pivotally mounted upon said first-mentioned forming plate, a plurality of clamping arms pivotally mounted upon the standard, means upon said arms to force the forming members together, an outer sole forming plate, means to heat the forming plates, an expandible tree between the forming plates and co-operating therewith to form a boot, and fluid means to simultaneously expand and heat said tree.

8. A mold for rubber boots and the like having, in combination, a standard, a forming plate for a side of the leg and foot portions of a boot rigidly fast to said standard, another forming plate for the other side of the leg and foot portions of the boot pivotally mounted upon said first-mentioned forming plate, a plurality of clamping arms pivotally mounted upon the standard, means upon said arms to force the side forming plates together, an outer sole forming plate, means to raise and lower the sole forming plate, means to brace the sole forming plate, means to heat the forming plates, an expandible tree between the forming plates and cooperating therewith to form a boot and fluid means to simultaneously expand and heat said tree.

9. A mold for rubber boots and the like having, in combination, a standard, a forming plate for a side of the leg and foot portions of a boot rigidly fast to said standard, another forming plate for the other side of the leg and foot portions of the boot pivotally mounted upon said first-mentioned forming plate, a plurality of clamping arms pivotally mounted upon the standard, a wedge mounted upon each of said arms and co-operating therewith to force the side forming plates together, an outer sole forming plate, means to raise and lower the sole forming plate, means to brace the sole forming plate, means to heat the forming plates, means to control the temperature of said heating means, an expandible tree between the forming plates and co-operating therewith to form a boot, and fluid means to simultaneously expand and heat said tree.

In testimony whereof we have hereunto set our hands.

ALFRED A. GLIDDEN.
HOWARD G. ELLIS.
HERBERT L. DAVIS.